United States Patent [19]

Conte

[11] 4,164,835
[45] Aug. 21, 1979

[54] GRASS CUTTER

[76] Inventor: Joseph Conte, 3740 Davis Blvd., Sarasota, Fla. 33580

[21] Appl. No.: 831,766

[22] Filed: Sep. 9, 1977

[51] Int. Cl.$^2$ .............................................. A01D 55/24
[52] U.S. Cl. ........................................ 56/291; 30/381
[58] Field of Search ............... 56/290, 291, 292, 244, 56/245; 30/381, 382

[56] References Cited

U.S. PATENT DOCUMENTS

| | | | |
|---|---|---|---|
| 374,397 | 12/1887 | Clark | 56/291 |
| 1,053,289 | 2/1913 | Jacobs et al. | 56/292 |
| 1,967,116 | 7/1934 | Gerdetz | 56/290 |
| 2,034,058 | 3/1936 | Sacrey | 56/291 |
| 2,043,603 | 6/1936 | Allward | 56/290 |
| 2,728,181 | 12/1955 | Carpenter | 56/244 |
| 2,744,376 | 5/1956 | Miner | 56/290 |
| 2,867,069 | 1/1959 | Ellis | 56/291 |
| 3,006,126 | 10/1961 | Viverette | 56/291 |
| 3,024,545 | 3/1962 | Clark et al. | 56/291 |
| 3,242,659 | 3/1966 | Dunlap | 56/244 |
| 3,397,524 | 8/1968 | Hofer | 56/290 |
| 3,509,704 | 5/1970 | Henzman | 56/291 |
| 3,545,188 | 12/1970 | Locati | 56/292 |
| 3,587,679 | 6/1971 | Conte | 30/381 |
| 3,641,751 | 2/1972 | Locati et al. | 56/292 |
| 3,651,626 | 3/1972 | Locati | 56/290 |
| 3,682,012 | 8/1972 | Blankenship | 56/291 |
| 3,698,167 | 10/1972 | Hurlbut | 56/291 |
| 3,831,358 | 8/1974 | Marsh et al. | 56/291 |

FOREIGN PATENT DOCUMENTS

| 122297 | 4/1931 | Fed. Rep. of Germany | 56/291 |
|---|---|---|---|
| 1317989 | 1/1963 | France | 56/290 |

*Primary Examiner*—Russell R. Kinsey
*Assistant Examiner*—Paul J. Hirsch
*Attorney, Agent, or Firm*—Stein & Frijouf

[57] ABSTRACT

A cutting device designed to shear vegetation such as grass comprising an endless cutting member laced about drive and idle pulleys. The endless cutting member comprises, in the first embodiment of this invention, an endless cable wrapped circumferentially by a helical coil with cutting elements and cogs mounted thereon. In a second embodiment, the endless cutting member comprises an endless steel band with cutting elements welded thereon. In both embodiments, the cutting elements move between two rows of teeth of a comb disposed along the frontal cutting portion of the cutting device, thereby shearing the grass as the cutting elements flow between the teeth.

16 Claims, 8 Drawing Figures

GRASS CUTTER

BACKGROUND OF THE INVENTION

1. Field of the Invention

This invention relates to cutting devices which incorporate an endless cutting member and more particularly to an improved endless cable for mounting cutting teeth through an intermediate member.

2. Description of the Prior Art

Presently, there exists many types of cutting machines which incorporate an endless cutting member. The most basic type consists of an endless cutting member mounted about a drive pulley and an idle pulley. The endless cutting member usually consists of a belt or chain with cutting elements mounted thereto. The belt rotates about the pulleys which move the cutting elements in an elongated circular motion, thereby cutting the material. U.S. Pat. Nos. 3,242,659 (Dunlop) and 2,744,376 (Miner) show such an operation. A major disadvantage of these inventions is their vulnerability to damage when the cutting elements hit an obstacle. Damage is then also imparted to the belt. Such usually requires the costly replacement of the entire belt along with the cutting elements.

Solutions have been presented to overcome the abovementioned disadvantages one being shown in U.S. Pat. No. 2,728,181 (Carpenter). In this patent, the cutting elements are pivotally mounted on a belt. When an obstacle is hit, the elements fold away, thereby preventing damage. A return spring moves the element back into the cutting position. Besides being expensive and quite bulky in structure, the belt is still subjected to large amounts of torsional strain caused by the pivot joint.

Other methods have been devised to absorb the shock of striking an obstacle. U.S. Pat. No. 3,831,358 (Marsh et al) shows an arcuate base integrally formed within the belt. Attached to each base is a cutting element. Upon striking an obstacle the base rotates within a similar arcuate groove within the belt, thereby relieving the strain. However belt is still subjected to a large amount of strain due to the integral base.

Further efforts have been made to minimize the damage imparted to the endless belt of the cutting mechanism. U.S. Pat. Nos. 3,509,704 (Henzman) and 3,587,679 (Conte) shows an endless stranded cable with cutting elements permanently connected thereto. In Henzman, the cutting elements are interlaced with the stranded wires of the cable, whereas in Conte the elements are securely welded to the cable. In both instances the striking of an obstacle may shear off many of the cutting elements. Another major inadequacy of these inventions is the elements interlaced and welded to the cable tends to weaken it. Additionally, when the elements are severed from the cable, the cable may be permanently damaged.

Another major disadvantage of the prior art is the method of cutting the material. Actually, the material is not "cut" but "whacked" off by the fast movement of the endless member. The whacking action roughly cuts the material, thereby leaving a jagged edge. In many applications, a jagged edge is undesirable.

Therefore, in order to overcome the inherent and particular inadequacies of the prior art, it is an object of this invention to provide a means to securely connect cutting elements onto an endless cutting member.

Another object of this invention is to further provide means to protect the endless member from wear and abrasion.

Another object of this invention is to provide a means to connect the elements to the endless belt member to prevent permanent damage to the machine in the case of breakage of the element off of the endless member.

Another object of this invention is to provide a means to protect the cutting elements from breakage.

Another object of this invention is to provide a means to protect objects such as humans from the cutting action of the invention.

Another object of this invention is to provide a means to smoothly cut the material.

Therefore, it is an object of this invention to provide an apparatus which overcomes the aforementioned inadequacies of the prior art devices and provides an improvement which is a significant contribution to the advancement of the pertinent art.

SUMMARY OF THE INVENTION

The subject invention is a new cutting device which facilitates the cutting or shearing of material. In particular, it is designed to cut vegetation such as grass. The device is used in a manner similar to many types of cutting machines such as a lawnmower, edge trimmer or hedge trimmer.

The cutting device consists of an endless cutting member laced about a drive means. The drive means comprises a drive pulley and an idle pulley. As the pulleys rotate, the endless cutting member moves about the pulleys in an elongated circular motion.

The cutting device further comprises cutting elements mounted on the endless cutting member and a comb mounted on the frontal cutting portion of the device. The comb comprises a channel and teeth disposed along the length of the comb. The channel serves to direct and support the endless cutting member during rotation about the pulleys. The teeth are disposed in matched pairs such that the cutting elements move between each pair. Such cooperative movement of the teeth and cutting elements creates a shearing action.

A basic feature of this invention is the endless cutting member. In the first embodiment, the invention includes an inner cable tightly wrapped circumferentially by a helical coil with the cutting elements and cogs connected thereto. In the second embodiment, the invention includes an endless band with cutting elements mounted thereon.

The inner cable of the first embodiment may be any type of belt, intertwined cable, nylon, flexible plastic, etc., of sufficient strength. In particular, an inner cable comprising small strands of wires intertwined is most desirable. The intertwined strands of wire have approximately the same strength as a solid, endless wire of the same diameter but yet have a much higher degree of flexibility and thus are more resiliently bendable. The inner cable must be flexible so that it may bend when moving about the pulleys.

Another basic feature of this first embodiment is the helical coil which encircles and tightly grips the endless length of the inner cable. The helical coil tightly grips the inner circle so as to prevent any slippage of the inner cable within the helical coil. The helical coil serves to protect the cable from damage during cutting and provides a base for the cutting teeth.

The helical coil can be manufactured from any type of material which is durable. In particular, it is desirous for the helical coil to be made from steel. During the manufacture of this device, the helical coil may be spun onto the inner cable or rod in a manner similar to the common art of spinning wire onto a toriod. Alternatively, the inner cable may be spun as the helical coil is fed onto it. The ends of the inner cable are then simply connected together by a connecting means. The connecting means may be any type of device or operation that securely connects the ends of the endless cutting member.

A feature of the helical coil is its resiliency. The cutting elements and cogs mounted thereon are now resilient because of the helical coil's resiliency. If the cutting elements strike an uncuttable object, the spring characteristic of the helical coil tends to "give", which in turn causes the cutting elements to "give," thereby reducing the possibility of shearing a cutting element off of the helical coil or more excessively damaging the object. The resiliency of the cutting elements is determined by the resiliency of the helical coil. Therefore, the harder the material is, the less resilient the helical coil should be.

A feature of the endless cutting member in the first embodiment is durability. The helical coil, usually being made of a stronger material than the inner cable, protects the inner cable from abrasion and wear during use. Furthermore, in the event the cutting elements or cogs break off, the damage, if any, will not be imparted to the inner cable. Accordingly, the strength of the inner cable will be assured to prolong the life of the endless cutting member.

A feature of the endless cutting member in both embodiments is the adaptability to many types of cutting machines. In most instances, the endless cutting member can be used where any of the prior art endless belts are utilized. Hence the number of drive pulleys and idle pulleys is variable, depending on the particular use. Flat guide plates which are coplanar with the pulleys may be used to stabilize the endless cutting member when traveling between the pulleys. A familiar application of such a guide plate is found in the common chain saw.

The drive means of the subject invention is powered by any suitable power source. Typical power sources include, for example, an electric motor, an internal combustion engine, or a pneumatic piston device. A function of the drive pulley is to transmit power to the endless cutting member in an elongated circular motion. The idle pulley is a pulley similar in configuration and coplanar with the drive pulley. A function of the idle pulley is to provide a means for the endless cutting member to rotate about. It also serves to set the desired tension in the endless cutting member.

A basic feature of both embodiments of this invention is the shearing action. Rather than "whacking" the grass in order to cut it, this new cutting device shears the grass into a very smooth and even appearance. This is accomplished as each cutting element moves past each of the teeth of the comb. In essence, each of such movements acts like a pair of shears to shear the grass. Thus, as the endless cutting member continuously moves down the channel an endless number of shearing actions is performed.

Another basic feature of both embodiments is the disposition of the endless cutting member and comb assembly on the cutting device. The endless cutting member cooperating with the comb assembly is located on the frontal cutting portion of the cutting device to shear the grass before any portion of the cutting device, i.e., wheels, skids, etc., has a chance to depress the grass. Accordingly, a very evenly cut appearance is assured.

Another feature of both embodiments of this invention is the ease of connecting the cutting elements and/or the cogs onto the endless cutting member. Although any type of connecting means may be used, a simple but efficient connecting means is achieved by welding each cutting element and each cog to the helical coil. Since most welds are usually stronger than the metal being welded, the above-mentioned connecting means is probably the most secure and efficient method.

Another feature of both embodiments of this invention is the inherent safety factor. Each pair of teeth of the comb is disposed longer than the cutting elements located therebetween. Such serves to protect the cutting elements in the event the comb is pushed against an obstacle such as a tree and prevents people and animals from being accidentally injured by the endless cutting member.

A feature of the pulleys includes means to locate and grip the endless cutting member. In the first embodiment of the invention, each pulley comprises a channel within the edge of its circumference. In operation, the endless cutting member flows into the channel as the pulleys rotate. The channel serves to position the endless cutting member about the edge of the pulley thereby preventing the endless cutting member from slipping off of the edge. The pulleys may further comprise a second channel to receive the cogs welded onto the helical coil as they rotate around the pulley. In this manner, if the endless cable member jams during cutting of the grass, it may then slip within the channels. Alternatively, the pulleys may comprise equally spaced indentations within the bottom of the channel. The cogs, which are connected to the helical coil, are correspondingly spaced to fit into the indentations thereby preventing any slippage of the endless cutting member upon rotation about the pulleys.

In the second embodiment, the pulleys comprise a friction surface contiguous to the circumferential edge of each pulley. The friction surface may be formed by a knurling operation or made from any material which prevents or hinders any slipping movement of the endless cutting member on the pulleys.

It is noted that the pulley in both embodiments of the invention may be replaced by other devices which provide a means for the endless cutting member to rotate about. For example, sprocket wheels or the like could be incorporated into the invention.

DESCRIPTION OF THE PREFERRED EMBODIMENT

Figure 1:
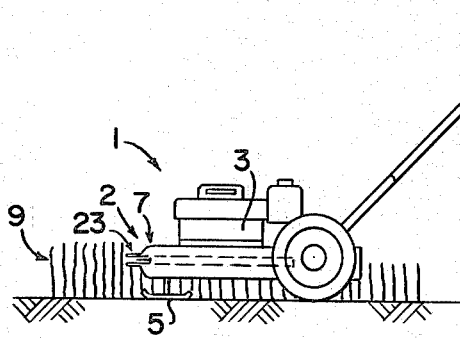
FIG. 1 is a side view showing the cutting device incorporated into a lawnmower.

FIG. 1 shows the preferred use of the cutting device 2 as used in a lawnmower 1. The power means of the cutting device 2 is generally shown as a gasoline engine 3. A skid 5 supports the frontal cutting portion 7 of the lawnmower 1. The frontal cutting portion 7 shears the grass 9 as the lawnmower 1 is pushed in the direction of arrow 11.

Figure 2:
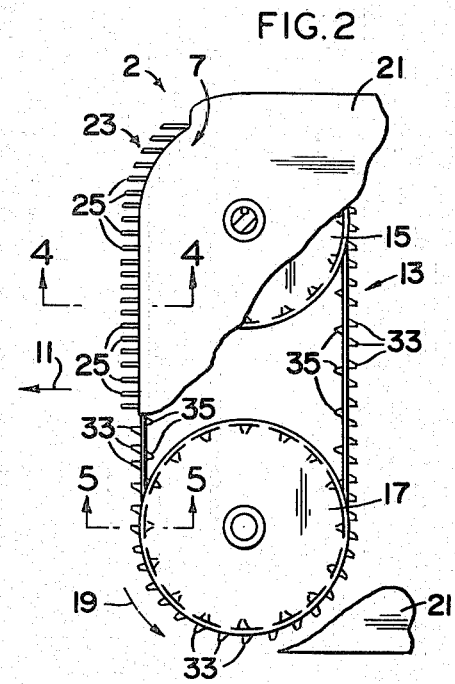
FIG. 2 is a cut-away top view of the first embodiment of the cutting device.
Figure 3:
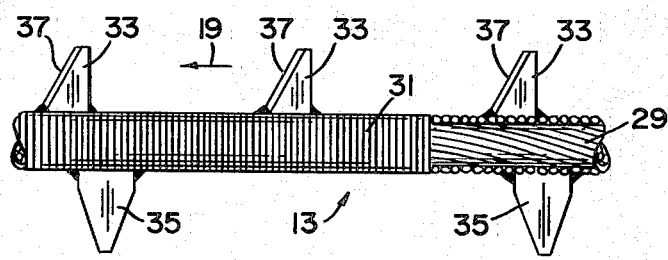
FIG. 3 is a partial side view of the endless cutting member of FIG. 2.
Figure 6:
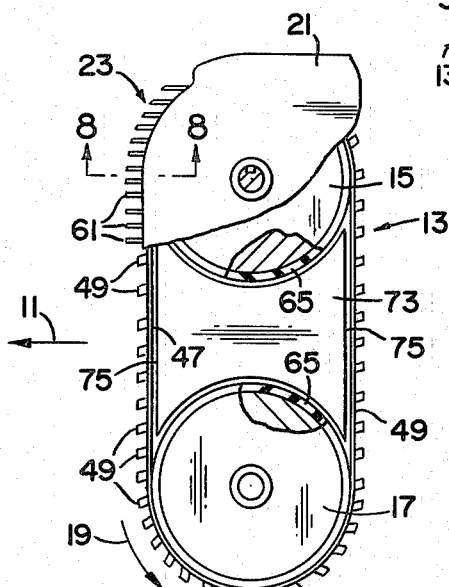
FIG. 6 is a cut-away top view of the second embodiment of the cutting device.

As best seen in FIG. 2 and 6, the cutting device 2 includes an endless cutting member 13 laced about a drive pulley 15 and an idle pulley 17. The power created by gasoline engine 3 may be transferred to the drive pulley 15 by any suitable mechanical linkage or belt assembly (not shown). Such power moves the endless cutting member 13 in a counterclockwise direction 19 as viewed from the top of the cutting device 2. Although many configurations may be possible through the use of additional pulleys, the cutting device 2 is shown to move in a substantially elongated circular motion. The idle pulley 17 provides a means for the endless cutting member 13 to rotate about and to adjust the tension of the endless cutting member 13. Suitable mechanical linkages or belts (not shown) may be used to adjust the position of the idle pulley 17 with respect to the drive pulley 15 thereby adjusting the tension of the endless cutting member 13.

The cutting device 2 further comprises a protective cover 21 with a comb assembly 23 disposed along the frontal cutting portion 7. The protective cover 21 encloses the cutting device 2 to guard against a person or animal being harmed from accidentally touching the moving parts enclosed therein. The comb assembly 23 includes an upper row of comb teeth 25 and a lower row of comb teeth 27 creating a channel therebetween. The endless cutting member 13 moves within the channel for cutting the grass 9.

More specifically, the first embodiment of the cutting device 2 is shown in FIGS. 2, 3, 4 and 5 includes an endless inner cable 29 tightly wrapped circumferentially by an outer helical coil 31. Welded thereto are cutting elements 33 and cogs 35.

Figure 4:
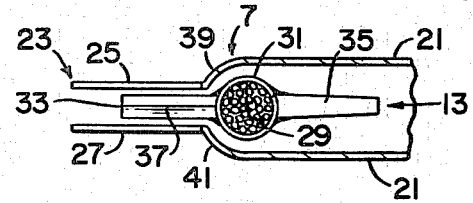
FIG. 4 is a cross-sectional view along lines 4—4 of FIG. 2 showing the endless cutting member and comb assembly.
Figure 5:
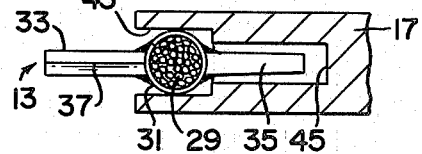
FIG. 5 is a cross-sectional view along lines 5—5 of FIG. 2 showing the endless cutting member and pulley.

As best seen in FIGS. 4 and 5, the endless inner cable 29 is shown as small intertwined wires to render the endless inner cable 29 flexible while still maintaining overall strength. The endless inner cable 29 must be flexible for easy travel around the drive pulley 15 and idle pulley 17.

The outer helical coil 31 tightly encircles the endless inner cable 29 thereby preventing any slippage of the endless inner cable 29 within the helical coil 31. The helical coil 31 is preferably manufactured from a hard spring steel to render the helical coil 31 resilient in a manner similar to a common spring. Furthermore, a hardness serves to protect the endless inner cable 29 from abrasion or damage. Any damage imparted to the endless cutting member 13 is thus limited to the helical coil 31. Therefore, the protective nature of the helical coil 31 assures the cutting device 2 will be operable under the most demanding cutting operations.

The cutting elements 33 and cogs 35 are positioned on diametrically opposite sides of the endless cutting member 13 and are spot welded to the helical coil 31. In operation, if the cutting elements 33 strike an obstacle, the resilient nature of the helical coil 31 allows the cutting elements 33 to "give," thereby reducing the possibility of shearing off cutting element 33. Each cutting element 33 is substantially right-triangular shaped with a cutting edge 37 disposed on the hypotenuse side. As best shown in FIG. 4, the cutting elements 33 travel contiguously between each pair of comb teeth 25, 27. Such motion creates a shearing action very similar to a pair of scissors. Accordingly, the cutting elements 33 shear the grass 9 as it flows between the comb teeth 25, 27.

The comb assembly 23 further comprises an upper arcuate portion 39 and a lower arcuate portion 41 which somewhat encircles to guide and support the endless cutting member 13 as it travels in its elongated circular motion. Other arcuate members could easily be incorporated to more substantially encircle the endless cutting member 13.

As best shown in FIG. 5, the drive pulley 15 and idle pulley 17 comprise a channel 43 in the circumferential edge of each pulley. The endless cutting member 13 flows into the channel 43 during travel in an elongated circular motion. The channel 43 serves to prevent the endless cutting member 13 from slipping off of the circumferential edge of each pulley. The pulleys 15, 17 further comprise equally spaced indentations 45 within the channel 43. The cogs 35 are disposed along the endless cutting member 13 to correspondingly fit into indentations 45 to prevent the endless cutting member 13 from slipping on the pulleys 15, 17. The cogs 35 and indentations 45 are substantially triangular shaped. In the event the endless cutting member 13 becomes misaligned with the channel 43, the cogs 35, being triangular shaped, tend to be guided into the indentations 45.

Figure 8:
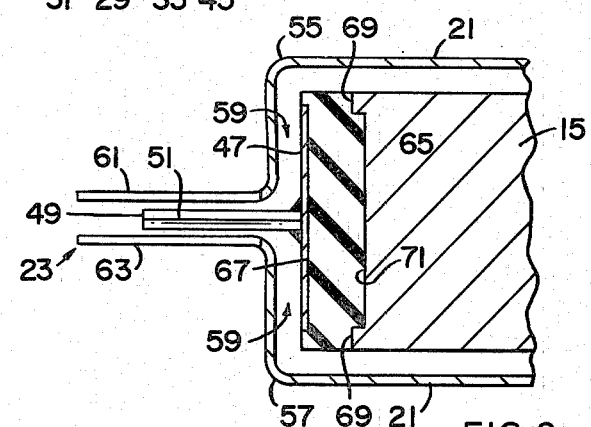
Figure 7:
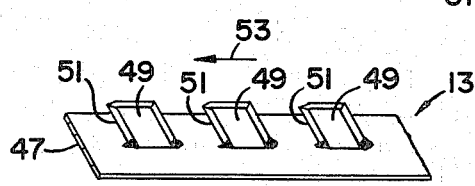
FIG. 7 is a partial perspective view of the endless cutting member of FIG. 6; and, FIG. 8 is a cross-sectional view along lines 8—8 of FIG. 6 showing the endless cutting member, comb assembly and pulley.

The second embodiment of the cutting device 2 is shown in FIGS. 6, 7 and 8. As best shown in FIG. 7, the endless cutting member 13 comprises an endless band 47 with a plurality of cutting elements 49 welded thereto. The cutting elements 49 are substantially rectangular in shape and are equally spaced along the endless band 47. The cutting edge 51 is disposed along the side of each cutting element 40 to cut the grass 9 as it moves in the direction indicated by arrow 53.

The comb assembly 23 in the second embodiment of the cutting device 2 includes an upper member 55 and a lower member 57 (FIG. 8), disposed about the endless cutting member 13 located therebetween thereby forming a substantially rectangular guide channel 59 to support and guide the endless cutting member 13 during travel down the comb assembly 23. The comb assembly 23 further includes a row of upper comb teeth 61 and a row of lower comb teeth 63. Each tooth of the upper row is matched with a tooth of the lower row. Such cooperation forms matched pairs of comb teeth 61, 63. Thus, in a manner very similar to the first embodiment, the cutting elements 49 move contiguously between each matched pair of comb teeth 61, 63, thereby creating a shearing action. In operation, as the endless cutting member 13 continuously rotates about the pulleys 15, 17, a shearing action is performed as each cutting element 49 travels between each matched pair of comb teeth 61, 63.

The drive pulley 15 and idle pulley 17, as applied to the second embodiment of the cutting device 2, further comprise a frictionous material 65 disposed along the circumferential edge of each pulley 15, 17. During operation, the frictionous material 65 serves to hinder or prevent any slippage of the endless band 47 on the pulleys 15, 17. As best shown in FIG. 8, the frictionous material 65 comprises a rectangular groove 67 to receive the endless band 47 as band 47 travels about pulley 15. The groove 67 indexes the endless band 47 to prevent the band 47 from slipping off of the edge of the pulley 15. The frictionous material 65 further comprises a flat rectangular step 69 extending contiguous to a corresponding channel in the pulley 15 to provide a sufficient means of securely attaching the frictionous material 65 onto the pulley 15.

As best shown in FIG. 6, a supportive plate 73 is incorporated into the second embodiment of the cutting device 2. The supporting plate 76 comprises a flat configuration with edges 75 defining the path of travel of the endless cutting member 13 during travel between the pulleys 15, 17. The edges 75 may have rectangular grooves (not shown) disposed along the length to index the endless band 47. The supportive plate 73 is coplanar with the pulleys 15, 17. A similar supportive plate (not shown) can be incorporated into the first embodiment of the cutting device 2. It can also have arcuate grooves within its edge to index and support the endless inner cable 29.

The present disclosure includes that contained in the appended claims, as well as that of the foregoing description. Although this invention has been described in its preferred form with a certain degree of particularity, it is understood that the present disclosure of the preferred embodiment has been made only by way of example and that numerous changes in the details of construction and the combination and arrangement of parts may be resorted to without departing from the spirit and scope of the invention.

Now that the invention has been described,
What is claimed is:

1. A cutting device comprising in combination,
an endless cutting member,
said endless cutting member comprising an endless inner cable means;
a helical outer coil means helically wound about the outer circumference of said inner cable means enabling limited movement therebetween;
a plurality of cutting element means secured only to said helical coil means;
said endless cutting member being disposed about a drive means; and
power means connected to said drive means for moving said endless cutting member with said limited movement between said inner cable means and said outer coil at least partially absorbing the shock produced by said cutting element means during the cutting action.

2. The cutting device as in claim 1 wherein said drive means comprises at least one drive pulley means and at least one idle pulley means.

3. The cutting device as in claim 1 wherein said inner cable means comprises intertwined strands of metal wire.

4. The cutting device as in claim 1 wherein said cutting element means are welded to said helical coil means.

5. The cutting device as in claim 2 wherein said drive pulley means and said idle pulley means have a channel disposed in the circumferential edge portion of each pulley means to receive said endless cutting member.

6. The cutting device as in claim 5 wherein said channel is a substantially rectangular shape groove.

7. The cutting device as in claim 1 wherein said endless cutting member further comprises a plurality of cog means securely connected to said helical coil means and disposed on substantially diametrically opposite sides of the said endless cutting member with respect to said cutting element means.

8. The cutting device as in claim 7 wherein said cog means are welded to said helical coil means.

9. The cutting device as in claim 7 wherein said cog means are equally spaced along said endless cutting member to correspondingly fit into indentations disposed along the circumferential edge portion of said drive means.

10. The cutting device as in claim 9 wherein said indentations are disposed in the bottommost portion of the said channel.

11. The cutting device of claim 1 further comprising a plate means disposed in a substantially coplanar relationship with said drive means and located within a elongated circle formed by the movement of the said endless cutting member thereby acting as a support or backing for said endless cutting member.

12. The cutting device of claim 1 further comprising a comb means disposed along the frontal cutting portion of said cutting device and configured to form a channel to receive said endless cutting member.

13. The cutting device of claim 12 wherein said channel of the said comb means comprises a substantially arcuate upper member and a substantially arcuate lower member circuately disposed about said endless cutting member thereby acting as a support or guide for the said endless cutting member.

14. The cutting device of claim 12 wherein said comb means further comprises an upper row of comb teeth connected to said upper member and a lower row of comb teeth connected to said lower member and disposed parallel to said cutting element means located therebetween.

15. The cutting device of claim 14 wherein the length of said comb teeth are longer than the length of said cutting element means thereby protecting said cutting elements from damage upon hitting an obstacle.

16. A cutting device comprising, in combination:
an endless cutting member;
said endless cutting member comprising an endless inner cable means;
an outer member engaging the outer circumference of said inner cable means enabling limited movement therebetween;
a plurality of cutting elements secured only to said outer member;
said endless cutting member being disposed about a drive pulley means and an idler pulley means; and
power means connected to said drive pulley means for moving said endless cutting member about said pulley means with the said limited movement between said inner cable means and said outer member at least partially absorbing the shock produced by said cutting element means during the cutting action.

* * * * *

UNITED STATES PATENT AND TRADEMARK OFFICE
CERTIFICATE OF CORRECTION

PATENT NO. : 4,164,835
DATED : August 21, 1979
INVENTOR(S) : Joseph Conte

It is certified that error appears in the above-identified patent and that said Letters Patent are hereby corrected as shown below:

Column 5, line 58, "a" second occasion should be -- the --;

Column 6, line 42, "40" should be -- 49 --;

Column 6, line 43, delete "as it moves in the direction" and insert -- during movement --;

Column 7, line 3, after "as" insert -- the --;

Column 7, line 5, after "band" delete "47".

Signed and Sealed this

Fifth Day of February 1980

[SEAL]

Attest:

SIDNEY A. DIAMOND

Attesting Officer

Commissioner of Patents and Trademarks